E. C. BLACKSTONE & R. E. WATTS.
SIDE DELIVERY RAKE.
APPLICATION FILED DEC. 11, 1908.
935,456.
Patented Sept. 28, 1909.
3 SHEETS—SHEET 1.
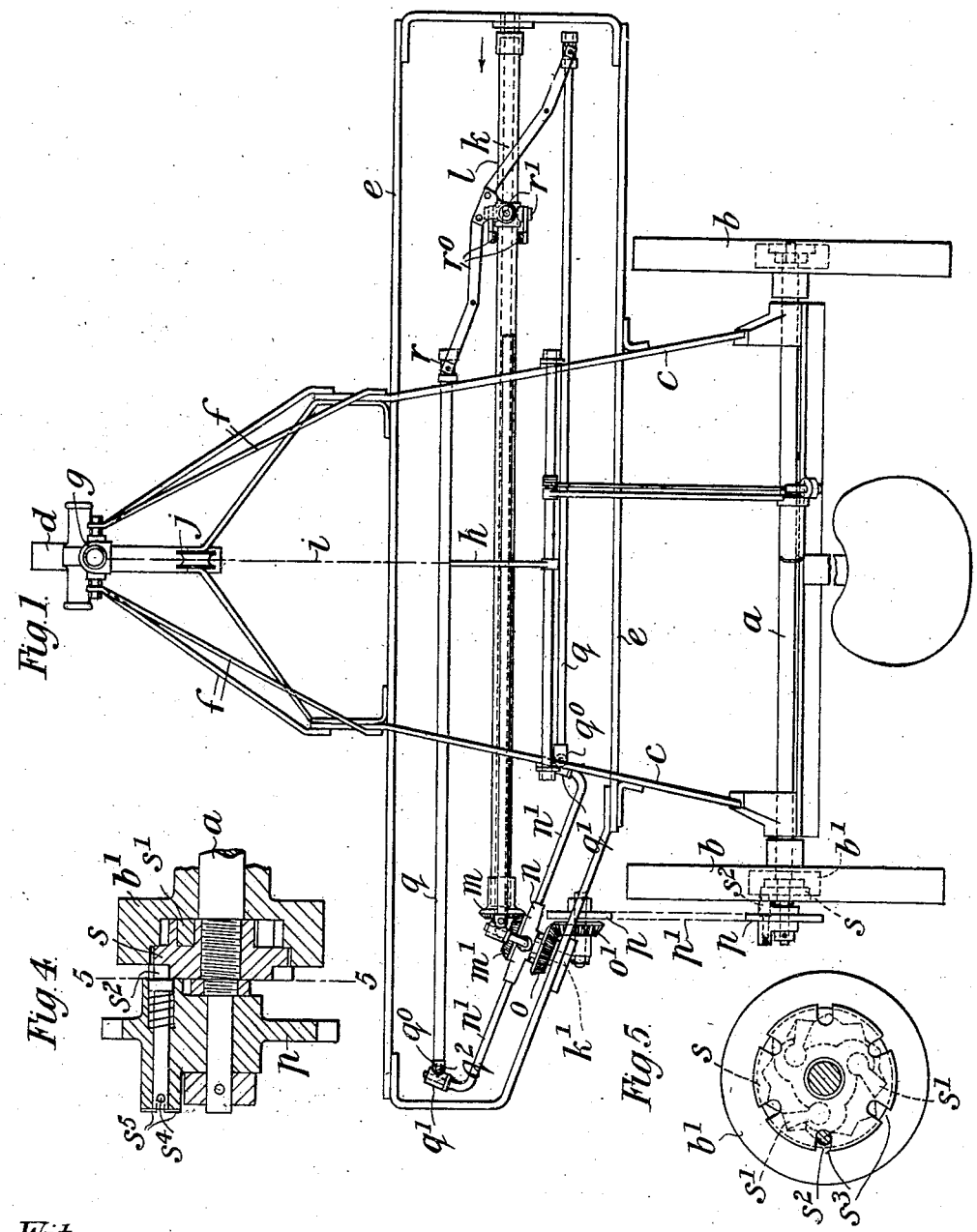

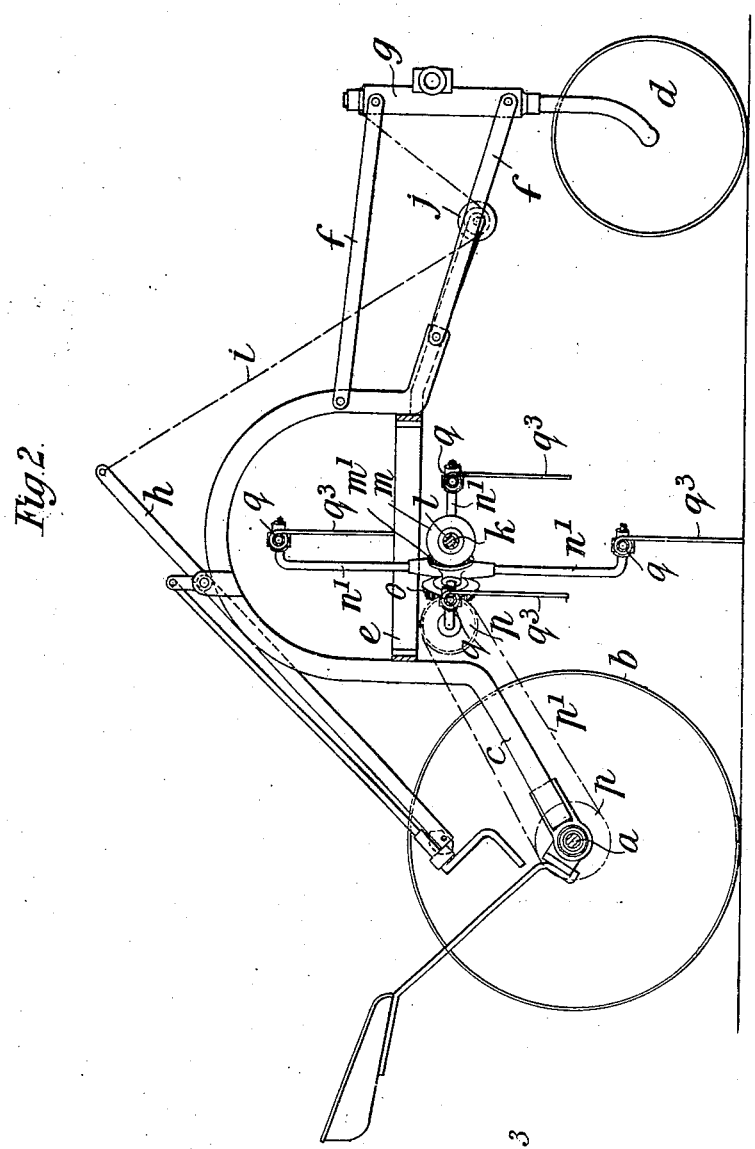

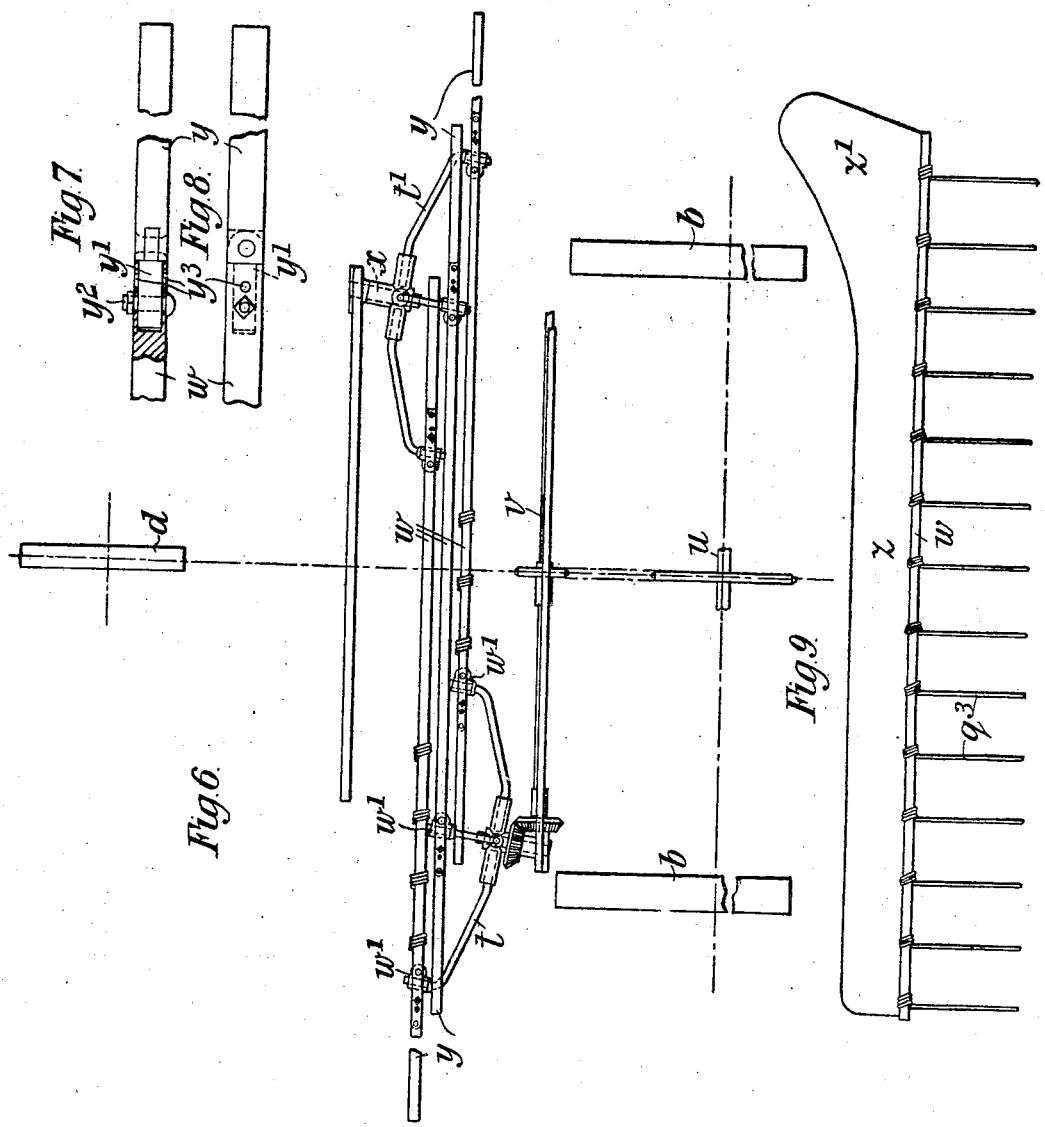

UNITED STATES PATENT OFFICE.

EDWARD CHRISTOPHER BLACKSTONE AND RICHARD EDWARD WATTS, OF STAMFORD, ENGLAND.

SIDE-DELIVERY RAKE.

935,456.

Specification of Letters Patent. Patented Sept. 28, 1909.

Application filed December 11, 1908. Serial No. 467,121.

*To all whom it may concern:*

Be it known that we, EDWARD CHRISTOPHER BLACKSTONE and RICHARD EDWARD WATTS, subjects of the King of Great Britain, residing at Rutland Engineering Works, Stamford, in the county of Lincoln, England, have invented new and useful Improvements in Side-Delivery Rakes, of which the following is a specification.

Our invention relates to side delivery hay-rakes of the kind in which a number of the rake bars are revolved around a common axis. Hitherto, such implements have had their rake-bars arranged obliquely to the main axle of the machine and their tines have traveled in planes either at right angles to the axis around which the rake-bars are revolved or at right angles to the line of draft.

In our improved machine we arrange our rake-bars parallel to the main axle, and revolve them around their axis so that their teeth or tines travel in planes oblique to the line of draft, whereby we are able to construct a neater and more compact implement of this class than has hitherto been possible.

To enable our invention to be fully understood we will describe the same by reference to the accompanying drawing, in which:—

Figure 1 is a plan of a side delivery rake constructed according to our invention, and Fig. 2 is a sectional side view of the same. Fig. 3 is a view, looking in the direction of the arrow, Fig. 1, of the rakes and the mechanism for carrying them at one end. Fig. 4 is a sectional view drawn to an enlarged scale of the boss of one of the traveling wheels showing the pawl mechanism in connection therewith, and Fig. 5 is a section on the line 5—5, Fig. 4. Fig. 6 is a plan illustrating a modification of our invention, and Figs. 7 and 8 are respectively a section and a plan of a detail. Fig. 9 is an elevation of one of the rake bars detached.

$a$ is the main axle of the machine and $b, b$ are the driving wheels mounted thereon.

$c$ is the main frame, which, at the rear end, is carried on the main axle $a$ and which, at the front end, is carried by the caster wheel $d$ the said main frame being provided with a transverse portion $e$ and having at the front the link portions $f, f$ which are pivotally connected to the frame proper and to the socket $g$ in which the standard of the caster wheel is carried.

$h$ is the lever connected by a chain $i$ to the socket $g$ and passing under a pulley $j$ on the framing, the said pulley serving for adjusting the height of the frame in a well known manner.

As shown in Figs. 1 and 2 the transverse portion $e$ of the frame has mounted in it, parallel to the axle $a$, a non-rotary spindle $k$ hereinafter referred to as the rake spindle. a short portion $k'$ at one end of the said rake spindle being bent to an obtuse angle.

On, and extending the whole length of the portion of the rake spindle parallel with the main axle $a$ is a sleeve or tube $l$ having fixed to it at one end the bevel gear wheel $m$ engaging with a similar wheel $m'$. This wheel $m'$ is secured to a hub $n$ carrying a number of radial arms $n'$ forming a kind of spider, and has fixed to it a bevel gear wheel $o$ which in turn engages with a similar bevel wheel $o'$ adapted to be driven from the main axle $a$ through the medium of sprocket wheels $p, p$ and a chain $p'$, so that the motion will be communicated from the driving wheels and the main axle to the spider and to the sleeve or tube $l$.

To the outer end of the arms $n', n'$ the rake bars $q\ q$ are hinged, by means of suitable joints $q^0, q^0$, four of such rake bars being preferably employed; the other ends of the said bars are carried in sockets $r, r$ at the outer ends of levers $r^0, r^0$ pivoted on studs $r', r'$, projecting radially from the sleeve $l$ and revolving with it, see Figs. 1 and 3, the said rake bars being free to turn in the said sockets, forming a kind of universal connection. Each of the joints $q^0$ advantageously consists of a socket $q'$ pivoted on a stud forming the extremity of a radial arm $n, n'$ and parallel with the axis of the hub $n$, and the end of each rake bar is hinged on a pin $q^2$ at right angles to the stud in the socket $q'$ so that a kind of universal joint is provided. With this arrangement the tines $q^3$ carried by the rake bars are maintained in a hanging or vertical position at all points of their revolution.

With the arrangement hereinbefore described the ends of the rake bars and consequently also the tines as they are revolved around the tube $l$ are moved in circular paths parallel with the plane of rotation of the hub $n$ and arms $n'$, $n'$ and obliquely to the line of draft. The motion of the driving wheels $b$, $b$ is, as shown, imparted to the main axle $a$ through a pawl disk $s$ and pawls $s'$, $s'$ contained in the boss $b'$ of each traveling wheel in the well known manner, see Figs. 4 and 5. A catch pin $s^2$ in one of the sprocket wheels $p$ and engaging with notches $s^3$ in the adjacent disk $s$ is provided for driving the said sprocket wheel $p$. By withdrawing the pin $s^2$ from its notch $s^3$ the motion of the main axle is prevented from being transmitted to the rake when the machine is being moved from place to place. The pin $s^2$ is provided with a cross pin $s^4$ which enables it to be withdrawn from the disk $s$ and rotated a quarter of a revolution so that the cross pin rests in recesses $s^5$ to hold the pin $s^2$ out of engagement with the said disk.

In the modification of our invention shown in Figs. 6 to 9 we dispense with the fixed spindle $k$, sleeve $l$ and pivoted levers $r^0$, $r^0$ hereinbefore described, and carry rake-bars between two spiders similar to that hereinbefore described, the driving spider $t$ receiving its motion from the main axle $u$ through the medium of a countershaft $v$ instead of from one of the traveling wheels as before described. The driving spider $t$ carries, by means of universal joints $w'$, $w'$, one end of each of the rake bars $w$, $w$ while the other ends of the said rake bars are carried by similar universal joints on the other spider $t'$ turning on a stud $x$, carried on the framing. As shown, both spiders are represented as being dished whereby the rake bars can be extended as at $y$, $y$ considerably beyond their points of connection with the said spiders, to increase the width of the rake. As, however, these extensions might form obstructions to the passage of the rake along narrow roads and through gateways, we may hinge them to the said bars or detachably secure them thereto. As shown in Figs. 7 and 8 the said extensions are hinged to short rods $y'$, $y'$ fitted into the ends of the rake bars $w$, $w$ and are held in alinement with the said rake bars, by bolts $y^2$, passing through holes in the rake bars and short rods respectively. By removing the said bolts $y^2$ the rods $y'$ can be partly withdrawn from the rake bars $w$ to enable the extensions $y$ to be turned on their hinges, the bolts being passed through holes $y^3$ in the rake bars to secure the short rods $y'$ in position.

$z$, Fig. 9, is a vertical board or plate with which we sometimes provide each of the rake bars, in order to prevent hay from falling over the said bars and being carried around, the said board being made deeper at the delivery end as at $z'$ where the crop is thickest.

Having now particularly described and ascertained the nature of our said invention and in what manner the same is to be performed, we declare that what we claim is:—

1. In a side delivery rake, the combination with the main frame and supporting wheels therefor, of a rotary arm mounted on the main frame adjacent to one side thereof, and constructed to rotate about an axis inclined to the line of draft, a rotary arm located adjacent to the other side of the machine, a rake bar disposed perpendicularly to the line of draft, and connected to each of said arms adjacent to their outer ends, and mechanism for rotating said arms.

2. In a side delivery rake, the combination with the main frame and supporting wheels therefor, of a rotary arm mounted on the main frame adjacent to one side thereof, and constructed to rotate about an axis inclined to the line of draft, a rotary arm located adjacent to the other side of the machine, a rake bar disposed perpendicularly to the line of draft connected to each of said arms adjacent to their outer ends, by devices permitting universal movement between the rake bar and said arms, and mechanism for rotating said arms.

3. In a side delivery rake, the combination with the main frame and supporting wheels therefor, of a plurality of rotary arms mounted on the main frame, on an axis substantially horizontal and inclined to the line of draft, connections between said rotary arms and a supporting wheel for imparting rotary motion to said arms, a series of rake bars disposed perpendicularly to the line of draft, each of said bars being connected pivotally to one of said arms, a second series of rotary arms mounted on the main frame, each of said second series of arms being pivotally connected to one of said rake bars.

4. In a side delivery rake, the combination with the main frame, and supporting wheels therefor, of a rotary spider, mounted on the main frame at one side thereof on an axis substantially horizontal and inclined with respect to the line of draft, a rotary part at the other side of the frame provided with a series of arms equal in number to those of the spider, operative connections between said arms and the spider for causing them to rotate simultaneously, and a series of rake bars disposed perpendicularly to the line of draft, each rake bar being connected to an arm of the spider and to one of said rotary arms, by devices permitting universal movement.

5. In a side delivery rake, the combination with the main frame, and supporting wheels therefor, of a rotary device at one side of the frame, constructed to rotate about an axis substantially horizontal and inclined to the line of draft, a rotary device at the other side of the machine, means for imparting motion to said rotary devices, and a rake bar operatively connected with each of said rotary devices and provided with a vertically disposed board above said bar.

6. In a side delivery rake, the combination with the main frame, and supporting wheels therefor, of a rotary device at one side of the frame, constructed to rotate about an axis substantially horizontal and inclined to the line of draft, a rotary device at the other side of the machine, means for imparting motion to said rotary devices, and a rake bar operatively connected with each of said rotary devices and provided with a vertically disposed board above said bar, said board being of greater depth adjacent to the delivery end of the rake bar than at the other end of the same.

7. In a side delivery rake, the combination with the main frame and supporting wheels, of a plurality of rotary arms mounted on the main frame, on an axis substantially horizontal and inclined to the line of draft, a series of rake bars disposed perpendicularly to the line of draft and provided with vertically disposed teeth, connections between each of said arms and one of said rake bars constructed to cause the rake teeth to maintain a vertical position at all times, and a second series of rotary arms mounted on the frame and connected with said rake bars.

8. In a side delivery rake, the combination with the main frame and supporting wheels, of a rotary arm mounted adjacent to one side thereof, and rotatable on a substantially horizontal axis inclined to the line of draft, said arm having a pivotal portion adjacent to its outer end, a socket pivotally mounted on said pivotal portion of the arm, a rake bar disposed perpendicularly to the line of draft and pivotally connected to said socket, adjacent to one end, and a rotary arm at the opposite side of the frame, engaging the rake bar adjacent to its other end.

9. In a side delivery rake, the combination with the main frame and supporting wheels, of a rotary arm mounted adjacent to one side of the frame, on an axis substantially horizontal and inclined to the line of draft, a rotary arm, mounted adjacent to the other side of the machine, a rake bar disposed perpendicularly to the line of draft and connected with said rotary arms, said rake bar having extensions at each end projecting beyond the points of connection of said arms therewith.

10. In a side delivery rake, the combination with the main frame and supporting wheels, of a rotary arm mounted adjacent to one side of the frame, on an axis substantially horizontal and inclined to the line of draft, a rotary arm, mounted adjacent to the other side of the machine, a rake bar disposed perpendicularly to the line of draft and connected with said rotary arms, said rake bar having extensions pivotally connected therewith and extending outwardly beyond the points of connection between said arms and the rake bar, and devices for locking said extensions in position with respect to the main portion of the rake bar.

EDWARD CHRISTOPHER BLACKSTONE.
RICHARD EDWARD WATTS.

Witnesses:
JOHN E. BOUSFIELD,
C. G. REDFERN.